(12) United States Patent
Ivanov et al.

(10) Patent No.: US 7,880,674 B2
(45) Date of Patent: Feb. 1, 2011

(54) TRACKING SYSTEM FOR FLAT MOBILE ANTENNA

(75) Inventors: Ivan Ivanov, Sofia (BG); Hristo Prodanov, Sofia (BG); Velislav Panayotov, Sofia (BG)

(73) Assignee: Raysat Cyprus Limited, Nicosia (CY)

( * ) Notice: Subject to any disclaimer, the term of this patent is extended or adjusted under 35 U.S.C. 154(b) by 0 days.

(21) Appl. No.: 10/548,087

(22) PCT Filed: Mar. 8, 2004

(86) PCT No.: PCT/BG2004/000004

§ 371 (c)(1),
(2), (4) Date: Jun. 20, 2006

(87) PCT Pub. No.: WO2004/079859

PCT Pub. Date: Sep. 16, 2004

(65) Prior Publication Data

US 2006/0273958 A1 Dec. 7, 2006

(30) Foreign Application Priority Data

Mar. 7, 2003 (BG) .................................. 107622

(51) Int. Cl.
*H01Q 3/00* (2006.01)
(52) U.S. Cl. ..................................................... 342/359
(58) Field of Classification Search ............... 342/81, 342/359–361; 343/757, 765
See application file for complete search history.

(56) References Cited

U.S. PATENT DOCUMENTS 4,586,050 A * 4/1986 Kuroda et al. ............... 342/426
5,227,806 A * 7/1993 Eguchi ........................ 343/765
5,309,162 A   5/1994 Uematsu et al.

(Continued)

FOREIGN PATENT DOCUMENTS

JP        07 154128 A        6/1995

(Continued)

OTHER PUBLICATIONS

Patent Abstracts of Japan: vol. 1996, No. 01, Jan. 31, 1996.

(Continued)

*Primary Examiner*—Thomas H Tarcza
*Assistant Examiner*—Nga X Nguyen
(74) *Attorney, Agent, or Firm*—D. Kligler I.P. Services Ltd.

(57) ABSTRACT

Tracking system for flat mobile antenna, which includes: sensors for angular velocity (1), which sense the rotation of the antenna around their axes; sensors, sensing the orientation of the antenna according to vertical axis (2); control block (3), which calculates necessary corrections of the direction of antenna beam and which is connected to outputs of sensors (1, 2) and with inputs of driving block (4) and beam control block (5); at least one motor (7), which changes the orientation of the antenna and which is connected to the output of driving block (4) and which drives the antenna panel (8); block for electronic beam steering (5), which is connected to antenna panel (8); power supply block, which converts the voltage from the electrical network of the vehicle into suitable values for providing of power supply of all blocks of the system.

14 Claims, 4 Drawing Sheets

U.S. PATENT DOCUMENTS

| | | | | |
|---|---|---|---|---|
| 5,463,402 A | * | 10/1995 | Walrath et al. | 342/359 |
| 5,900,836 A | | 5/1999 | Nishikawa et al. | |
| 6,052,084 A | * | 4/2000 | Aoshima et al. | 342/358 |
| 6,191,734 B1 | * | 2/2001 | Park et al. | 342/359 |
| 6,377,211 B1 | * | 4/2002 | Hsiung | 342/359 |
| 2007/0103366 A1 | * | 5/2007 | Park | 342/359 |

FOREIGN PATENT DOCUMENTS

| | | |
|---|---|---|
| JP | 07 249918 A | 9/1995 |
| JP | 07 249919 A | 9/1995 |

OTHER PUBLICATIONS

Patent Abstracts of Japan: vol. 1995, No. 09, Oct. 31, 1995.

* cited by examiner

TRACKING SYSTEM FOR FLAT MOBILE ANTENNA

This application is a national stage application of co-pending PCT application PCT/BG2004/000004 filed Mar. 8, 2004, which was published in English under PCT Article 21(2) on Sep. 16, 2004, which claims priority to Bulgarian patent application ser. no. 107622, filed Mar. 7, 2003. The disclosures of these applications are expressly incorporated herein.

FIELD OF THE INVENTION

The present invention relates to a tracking system for flat antenna with combined mechanical pointing for one axis and electronic beam steering for the other axis, which can be mounted on moving vehicles and platforms and which provides television, Internet and other communication signals, transmitted by satellites.

PRIOR ART

In order to receive signals from satellite, the antenna mounted on a moving vehicle should keep its orientation, so that its beam to be always directed toward the satellite. For this purpose antennas with mechanical or/and electronic beam steering are required, which work under control of a tracking system, which reacts to the changes of orientation of the vehicle (or directly of the antenna) and issues commands to motors or to block for electronic beam control to provide necessary corrections in beam direction. In most cases such tracking systems include sensors for angular velocity (rate gyroscopes), based on quartz, piezo-electric or micro electro-mechanical (MEMS) technology. They feature a low price, but suffer by significant error, produced by temperature change, linear acceleration and other factors on their offset and scale factor. That's why a key element of different tracking systems, which use such sensors, are different methods for correction of antenna orientation and gyroscope errors, using the measured strength of received signal. Most widely used methods are those for mechanical scanning in a small area around the estimated direction towards the satellite and mono-pulse method.

U.S. Pat. No. 6,191,734 discloses a system, which uses a combined mechanical control of azimuth of the beam and electronic beam steering on elevation using phase shifters. By using additional phase shifters, beam tilting is obtained at small angles on both axes in order to achieve higher scanning rate. The disadvantage of the mentioned system is the requirement for additional phase shifters, which makes it more complex and expensive. Moreover, the tracking system does not perform an estimation of gyroscope errors, hence, the antenna may lose its direction shortly after the signal path is hidden by an obstacle.

U.S. Pat. No. 5,900,836 describes an antenna with mechanical drive. Its tracking system commands rotating in a given direction while a decreasing of signal strength is registered, after which the direction of movement is reversed. At particular intervals the movements in both directions are averaged and they are used later for correction of gyroscope offset. Due to big latencies of mechanical driving system the averaging intervals of such system are relatively large, which means that gyroscope offset corrections follow with big delays. Moreover, such a system can be affected by signal fluctuations due to small obstacles which don't completely interrupt the signal, but only decrease its strength for a short time.

U.S. Pat. No. 5,309,162 is provided for antenna system, where the control of the motor for every axis is performed using the phase difference between the signals, received by two antenna panels. This system does not use orientation sensors, that's why it cannot keep its orientation when the signal reception is interrupted by an obstacle.

SUMMARY OF THE INVENTION

An objective of the present invention is to provide a tracking system with low price, which keeps the antenna beam in the direction towards the selected satellite, regardless of the movement of the vehicle, where it is mounted. It is also desirable that the antenna orientation is kept even during temporary interruptions of the reception due to obstacles non-transparent to radio waves like buildings, trees, tunnels, bridges, hills, etc.

To achieve these and other advantages and in accordance with the purpose of the present invention the tracking system for flat mobile antenna comprises:

sensors for angular velocity (gyroscopes);

sensors, which measure the orientation of the antenna towards the vertical axis (inclinometers);

control block, which calculates needed corrections of the direction of antenna beam, depending on measurement from above-mentioned sensors;

at least one motor, which changes the antenna orientation;

driving electronics, which drive the motor/s in order to move the antenna in desired direction;

block for electronic beam steering;

power supply block, which converts the voltage from the electrical network of the vehicle into suitable values for providing power supply to all blocks of the system.

It is advisable to use three sensors for angular velocity, each one mounted in parallel to one of the axes of Cartesian coordinate system, fixed with the antenna panel.

It is advisable in this case to perform a forward coordinate transformation to obtain the necessary corrections of azimuth and elevation angle of antenna beam and reverse coordinate transformation for obtaining corrections of gyroscope offset.

In one particular variant of the tracking system the axes of two gyroscopes lay on the elevation plane while the axis of the third one is orthogonal to it.

It is advisable that the antenna panel is moved mechanically in a small angle at one axis of deflecting of antenna beam, while the antenna beam is positioned by electronic control at fixed positions on the other axis and the signal strength, measured in two or more positions in a close proximity to the direction toward the satellite is used for calculation of corrections of gyroscope offsets and for adjusting the orientation of the antenna beam.

It is advisable in this case that the antenna beam is controlled in such a way, that it keeps staying for a longer period in the fixed position, which is closest to the direction towards the satellite, while it is switched to neighboring fixed positions for much shorter intervals, thus keeping the average signal strength as high as possible.

It is advisable to perform an additional compensation of offsets for gyroscopes, which axes are horizontal or close to horizontal plane.

One possible variant of implementing such compensation is to integrate for a given time interval the output value of any one of gyroscope sensors, which axes are horizontal or close to horizontal plane, and if the result is positive, the offset of the corresponding gyroscope is corrected in positive direction, but if the result is negative, the offset is corrected in negative direction.

Another possible variant of such compensation is to transform the output signals of both gyroscopes into angular velocity vectors, which lie on the horizontal plane, and which sectors are integrated to obtain the inclination angles of the axes of both gyroscopes, which angles are compared with output signals of two inclination sensors (inclinometers), measuring the inclination angles of axes of mentioned gyroscopes, and the result from this comparison is used to adjust the estimated offsets of mentioned gyroscopes.

The advantages of the tracking system according to the present invention are: using low-cost sensors, decreased impact of gyroscope errors on tracking error, improved speed of correction of gyroscope errors using measured strength of received signal in comparison with antennas with mechanical-only beam movement, improved average signal-to-noise ratio (SNR) due to longer periods when the antenna beam is kept close to direction toward the satellite.

DETAILED DESCRIPTION OF THE PREFERRED EMBODIMENT

Figure 1:
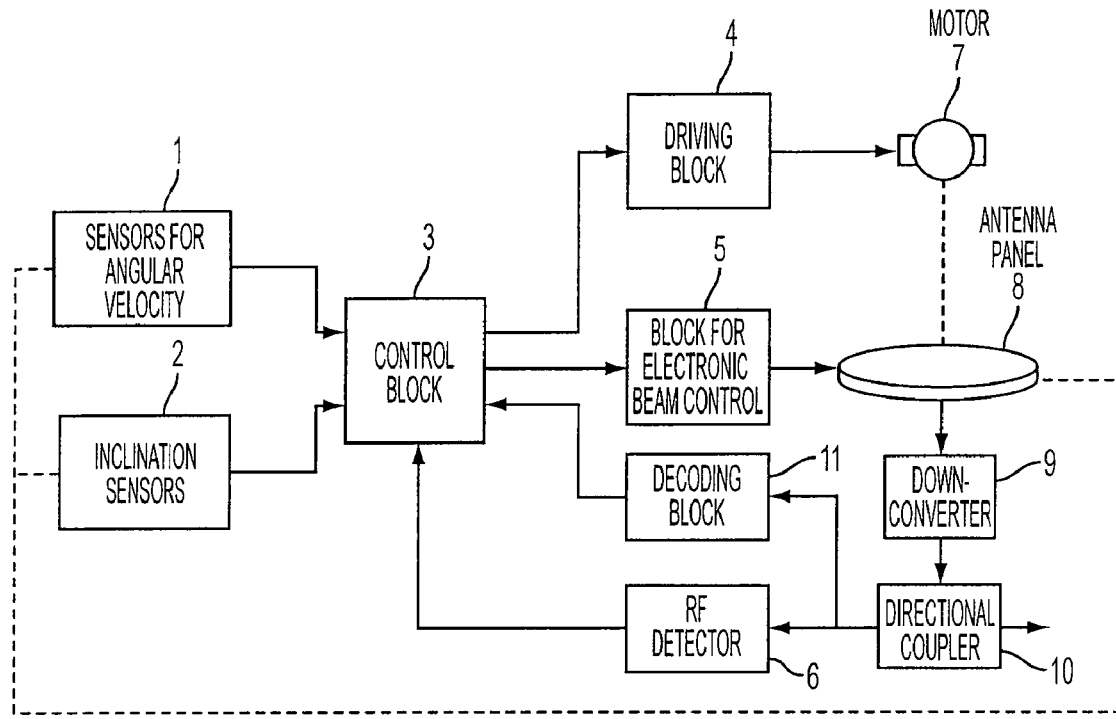
FIG. 1 is a block diagram of the tracking system according to the current invention.

One possible variant of implementation of tracking system according to the present invention is shown at FIG. 1. It comprises sensors for angular velocity (gyroscopes) 1, inclination sensors 2, control block 3, driving block 4, motor 7, block for electronic beam control 5, antenna panel with electronic beam steering 8, down-converter 9, directional coupler 10, decoding block 11, and RF detector 6.

The outputs of gyroscope sensors 1 and outputs of inclination sensors 2 are fed to control block 3, as well as the outputs of RF detector 6 and block for decoding of received signal 11 are. One of the outputs of the control block 3 is fed to the input of the block for electronic beam control 5, while the other output is fed to the input of the driving block 4, which output is fed to the motor 7, which moves the antenna panel 8. The antenna panel 8 output is fed to the input of the down-converter 9, which output is connected to inputs of RF detector 6 and the decoding block 11 through directional coupler 10.

Figure 2:
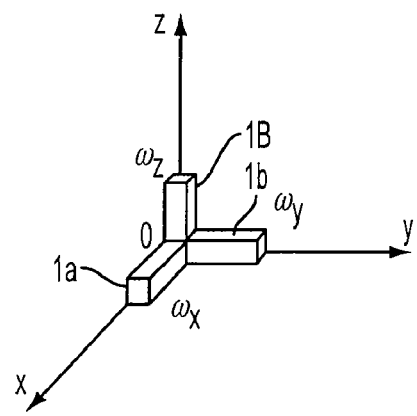
FIG. 2 is a drawing, showing the orientation of gyroscopes in Cartesian coordinate system, fixed with the antenna panel.

The angular velocity sensors could be solid-state gyroscopes, for example based on quartz, piezo-crystal, MEMS or another technology. They are fixed to antenna panel 8 and provide signals, which are proportional to its speed of rotation around particular axes. In the present embodiment are used three gyroscopes 1a, 1b and 1c, (FIG. 2), which are co-linear with the axes of Cartesian coordinate system Oxyz, fixed to antenna panel 8.

Figure 3:
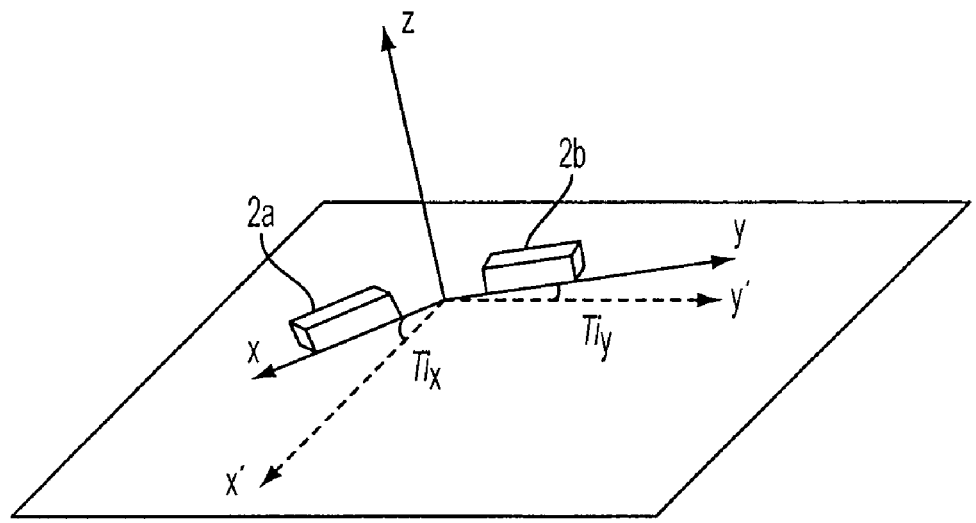
FIG. 3 is an illustration of the orientation of inclination sensors toward axes of Cartesian coordinate system, fixed with the antenna panel and their projections on the horizontal plane.

The inclination sensors 2 could be solid-state, liquid-based or devices, based on another principle, which allow electronic measuring of the inclination of antenna panel toward the horizontal plane. In the present variant two inclination sensors, 2a and 2b, are used, which are fixed to antenna panel 8. It is also possible to use a two-axis sensor, which measures the inclination of two of antenna panel axes towards the horizontal plane (FIG. 3). It is desirable that these axes are the same as the axes of two of the gyroscopes 1a and 1b, as this simplifies the data processing by the control block.

Figure 5:
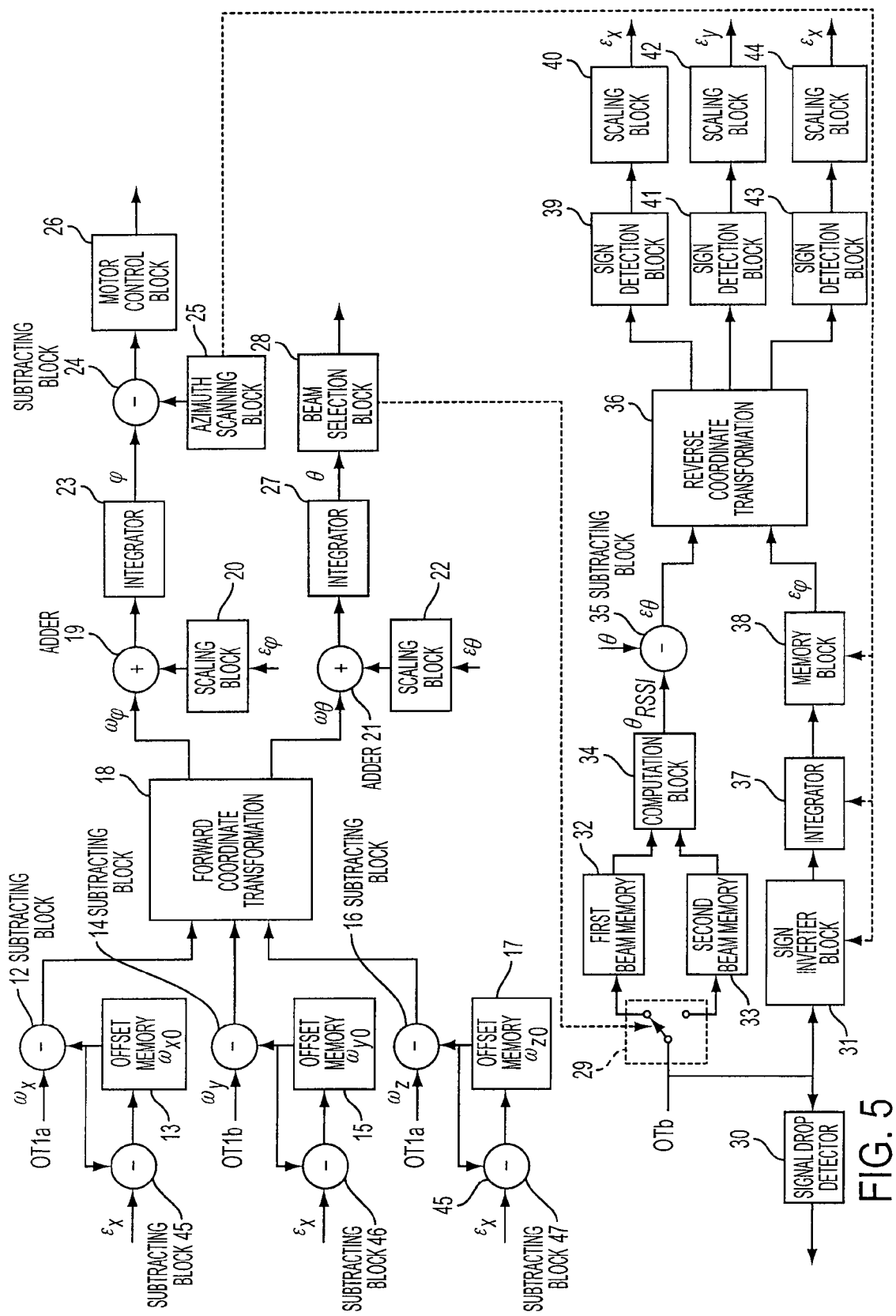
FIG. 5 represents a variant of implementation of the control block of tracking system, according to present invention.

FIG. 5 is a block diagram of the data processing, performed by the control block during satellite tracking. The output signal from gyroscope 1a is fed to the first input of subtracting block 12, to which second input the output signal from offset memory $\omega_{x0}$ 13 is fed. The output signal from gyroscope 1b is fed to the first input of subtracting block 14, to which second input the output signal from offset memory $\omega_{y0}$ 15 is fed. The output signal from gyroscope 1c is fed to the first input of subtracting block 16, to which second input the output signal from offset memory $\omega_{z0}$ 17 is fed. The output signals from subtracting blocks 12, 14 and 16 are fed to the inputs of the block for forward coordinate transformation 18. The first output of the block for forward coordinate transformation 18 is fed to the first input of adder 19, which second input is fed to the output of scaling block 20. The second output of the block for forward coordinate transformation 18 is fed to the first input of adder 21, which second input is fed to the output of scaling block 22. The output of adder 19 is fed to the input of integrator 23, which output is fed to the first input of subtracting block 24. The second input of subtracting block 24 is fed to the output of azimuth scanning block 25. The output of subtracting block 24 is fed to the input of motor control block 26, which output is fed to the input of driving block 4. The output of adder 21 is fed to the input of integrator 27, which output is fed to the input of beam selection block 28. The output of beam selection block 28 is fed to the input of the block for electronic beam control 5.

The signal from RF detector 6 is fed to the input of switch 29, input of signal drop detector 30 and input of sign inverter block 31. The first output of switch 29 is fed to the input of first beam memory 32, while its second output is fed to the input of second beam memory 33. The output of the first beam memory 32 is fed to the first input of computation block 34, which second input is fed to the output of second beam memory 33. The output of the computation block 34 is fed to the first output of subtracting block 35, which second input is fed to the output of integrator 27. The output of subtracting block 35 is fed to the first input of block for reverse coordinate transformation 36.

The output of sign inverter block 31 is fed to the input of integrator 37, which output is fed to the input of memory block 38. The output of memory block 38 is fed to the second input of block for reverse coordinate transformation 36. The first output of block for reverse coordinate transformation 36 is fed to the input of sign detection block 39, which output is fed to the input of scaling block 40. The second output of block for reverse coordinate transformation 36 is fed to the input of sign detection block 41, which output is fed to the input of scaling block 42. The third output of block for reverse coordinate transformation 36 is fed to the input of sign detection block 43, which output is fed to the input of scaling block 44.

The output of scaling block 40 is fed to the second input of subtracting block 45, which first input is fed to the output of offset memory $\omega_{x0}$ 13. The output of subtracting block 45 is fed to the input of offset memory $\omega_{x0}$ 13. The output of scaling block 42 is fed to the second input of subtracting block 46, which first input is fed to the output of offset memory $\omega_{y0}$ 15. The output of subtracting block 46 is fed to the input of offset memory $\omega_{y0}$ 15. The output of scaling block 44 is fed to the second input of subtracting block 47, which first input is fed to the output of offset memory $\omega_{z0}$ 17. The output of subtracting block 47 is fed to the input of offset memory $\omega_{z0}$ 17.

Figure 6:
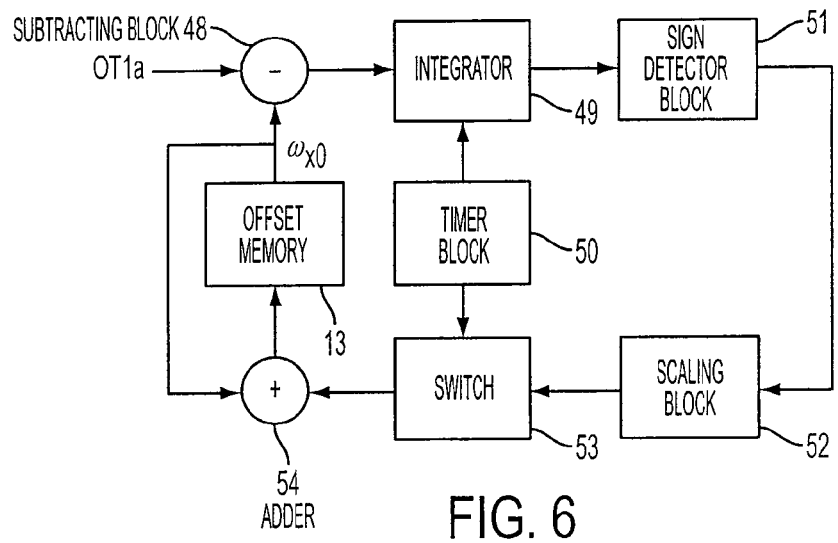
FIG. 6 is a block diagram of one variant of implementing the compensation of offset value of one of gyroscopes, which axis is close to horizontal plane.

FIG. 6 presents a block diagram of one variant for additional compensation of one of gyroscopes 1a, which axis is near to horizontal plane. A similar compensation is used for the second gyroscope 1b. The output signal of gyroscope 1a is fed to the first input of subtracting block 48, which second input is fed to the output of offset memory $\omega_{x0}$ 13. The output of subtracting block 48 is fed to the signal input of integrator 49, which reset input is fed to the first output of timer block 50. The output of integrator 49 is fed to the input of sign detector block 51, which output is fed to the input of scaling block 52. The output of scaling block 52 is fed to the signal input of switch 53, which control input is fed to the second output of timer block 50. The output of switch 53 is fed to the first input of adder 54, which second input is fed to the output of offset memory $\omega_{x0}$ 13. The output of adder 54 is fed to the input of offset memory $\omega_{x0}$ 13.

Figure 7:
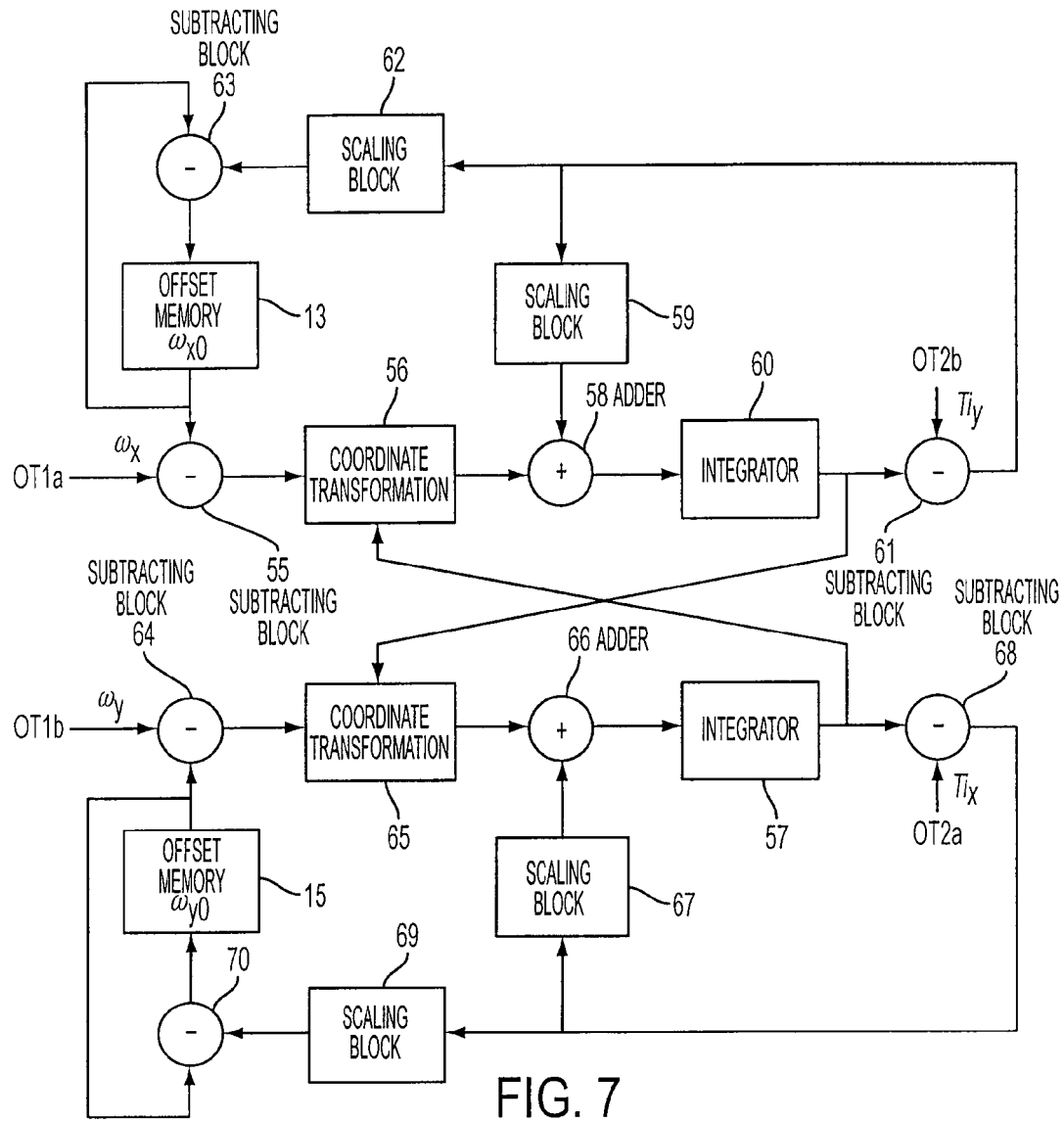
FIG. 7 is a block diagram of another variant of implementing the compensation of offset value of gyroscopes, which axes are close to horizontal plane.

FIG. 7 presents a block diagram of another variant for additional compensation of gyroscopes 1a and 1b, which axes are close to horizontal plane. The output of gyroscope 1a $\omega_x$ is fed to the first input of subtracting block 55, which second input is fed to the output of offset memory $\omega_{x0}$ 13. The output of subtracting block 55 is fed to the first input of the first block for coordinate transformation 56, which second input is fed to the output of integrator 57. The output of the first block for coordinate transformation 56 is fed to the first input of adder 58, which second input is fed to the output of scaling block 59. The output of adder 58 is fed to the input of integrator 60. The first input of subtracting block 61 is fed to the output of inclinometer 2b, while its second input is fed to the output of integrator 60. The output of subtracting block 61 is fed to inputs of scaling blocks 59 and 62. The first input of subtracting block 63 is fed to the output of offset memory $\omega_{x0}$ 13, while its second input is fed to the output of scaling block 62. The output of subtracting block 63 is fed to the input of offset memory $\omega_{x0}$ 13.

The output of gyroscope 1b $\omega_y$ is fed to the first input of subtracting block 64, which second input is fed to the output of offset memory $\omega_{y0}$ 15. The output of subtracting block 64 is fed to the first input of the second block for coordinate transformation 65, which second input is fed to the output of integrator 60. The output of the second block for coordinate transformation 65 is fed to the first input of adder 66, which second input is fed to the output of scaling block 67. The output of adder 66 is fed to the input of integrator 57. The first input of subtracting block 68 is fed to the output of inclinometer 2a, while its second input is fed to the output of integrator 57. The output of subtracting block 68 is fed to inputs of scaling blocks 67 and 69. The first input of subtracting block 70 is fed to the output of offset memory $\omega_{y0}$ 15, while its second input is fed to the output of scaling block 69. The output of subtracting block 70 is fed to the input of offset memory $\omega_{y0}$ 15.

The operation of the tracking system according to present invention is as follows:

The control block 3 operates in two modes—acquisition and tracking. During acquisition mode the motor 7 is commanded to rotate the antenna panel 8 around vertical axis with particular velocity. At the same time the block for electronic beam control 5 switches consecutively the antenna beams to cover the whole field of view of the antenna, while the RF detector 6 measures the strength of received signal. The described action continues until a local maximum of the signal strength is found. After that the decoding block 11 reads the identification data from the transport stream of received signal, which is compared with a defined value by the control block 3. If the received data do not match the defined value, the control block 3 continues the acquisition mode. When the identification data match the internal value, the control block 3 enters tracking mode. In this mode the control block 3 uses the signals from gyroscope block 1 and RF detector 6 to calculate the changes in antenna panel orientation towards the satellite direction, and issues the necessary control signals to the driving block 4 and the block for electronic beam control 5 to keep the antenna beam always directed towards the satellite.

The detailed description of the operation is as follows:

The contents of the offset memory $\omega_{x0}$ 13 is subtracted from the signal value $\omega_x$ of the first gyroscope 1a. The initial value, which is contained in the offset memory $\omega_{x0}$ 13 can be obtained by measurement of gyroscope signal during standstill condition or can be read from a table, prepared in advance, which defines the temperature dependence of the offset of particular gyroscope. The same operation is performed for output signals $\omega_y$ and $\omega_z$ of gyroscopes 1b and 1c. The resultant compensated signals correspond to angular velocities of antenna panel towards the three axes of Cartesian coordinate system Oxyz (FIG. 4), which are labeled as $\omega'_x$, $\omega'_y$ and $\omega'_z$. These three values are converted by the block for forward coordinate transformation 18 into angular velocities, collinear to axes of the coordinate system Oxsz, where s is a vector, pointing towards the satellite. As a result both angular velocities on elevation axis $\omega_\theta$ and on azimuth axis $\omega_\phi$ are obtained. By their integration by integrators 23 and 27 the deflection angles between the direction to the satellite and antenna panel axes by azimuth $\phi$ and by elevation $\theta$ are obtained. The azimuth scanning block 25 produces a sine signal with small amplitude and low frequency, which is subtracted from azimuth angle $\phi$. The resultant difference signal is processed by the motor control block 26 in such a way, that the azimuth angle $\phi$ is kept approximately equal to the output signal of azimuth scanning block 25. As a result the motor 7 drives the antenna panel to oscillate slowly around the expected satellite azimuth.

The sign inverter block 31 either passes with no change the signal from RF detector 6 or inverts its polarity, which is synchronized with the sine signal, produced by azimuth scanning block 25 in such a way, that the signal polarity of RF detector 6 is inverted when the sine signal is negative, or it is passed with no change when the sine signal is positive. The resultant signal at the output of sign inverter block 31 is integrated by integrator 37 for one sine period for the signal of azimuth scanning block 25. At the end of sine period the result of integrating is stored in the memory 38 and the value of integrator 37 is reset. The result, stored in memory 38 is used as an azimuth error in orientation of the antenna panel $\epsilon_\phi$. It is scaled by some coefficient in the scaling block 20 and is added to azimuth angular velocity $\omega_\phi$.

The beam selection block 28 determines the two beams, which are closest to estimated elevation angle $\theta$. The beam, which has a minimum distance to estimated elevation angle $\theta$ is considered as main beam, while the other—as secondary beam. The beam selection block 28 issues commands to the block for electronic beam control 5, so that the main beam is selected for a long period, while the secondary beam is selected for a short time, sufficient to measure the signal strength in its direction. The beam selection block 28 synchronizes the switch 29 with beam switching, so that the signal strength of the main beam is stored in the first beam memory 32, while the signal strength of the secondary beam is stored in the second beam memory 33. The values, stored in both beam memories 32 and 33 are used by the computation block 34 for calculation of the real elevation angle of the satellite toward the antenna panel $\theta_{RSSI}$. The subtracting block 35 produces the difference between $\theta_{RSSI}$ and obtained by gyroscope measurements elevation angle $\theta$, thus giving as result the elevation error $\omega$. It is scaled by some coefficient in the scaling block 22 and is added to elevation angular velocity $\omega_\theta$.

Figure 4:
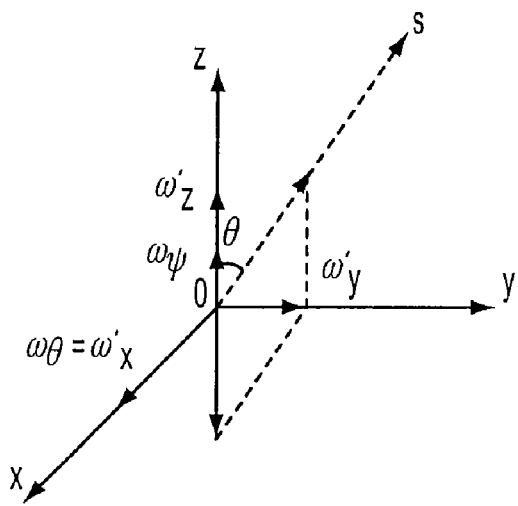
FIG. 4 is a diagram, which illustrates angular velocity vectors, corresponding to axes of Cartesian coordinate system, fixed with the antenna panel.

Both errors are used by the block for reverse coordinate transformation 36, which converts them into three components, respectively collinear to axes Ox, Oy and Oz of the Cartesian coordinate system Oxyz (FIG. 4). Every one of them is processed by a corresponding sign detector (respectively 39, 41 and 43), which gives a result of +1 if the corresponding component is positive or −1 in the case of negative component. The output values from three sign detectors 39, 41 and 43 are scaled in corresponding scaling blocks 40, 42 and 44, which in result gives the corrections, which need to be applied to offsets of three gyroscopes $\epsilon_x$, $\epsilon_y$ and $\epsilon_z$. Every correction is subtracted by subtracting blocks, respectively 45, 46 and 47, from the contents of offset memories, respectively 13, 15 and 17. The results from the subtraction are stored back into the same offset memories.

The signal drop detector 30 checks the strength of received signal. When it drops by more than a specified threshold value, it clears $\epsilon_\phi$ and $\epsilon_\theta$ errors, to prevent changing of $\omega_{x0}$, $\omega_{y0}$, $\omega_{z0}$, $\phi$ and $\theta$ due to the noise of detected signal during interruption of signal reception by some obstacle between antenna and satellite. In this case the antenna beam orientation is controlled only by gyroscope signals.

The described algorithm is able to calculate two independent error values $\epsilon_\phi$ and $\epsilon_\theta$, based on measurements of the signal strength at different points around the estimated direction to the satellite. However, in the reverse coordinate transformation there is no single solution for the corrections $\epsilon_x$, $\epsilon_y$ and $\epsilon_z$ of three particular gyroscopes 1a, 1b and 1c. To resolve this ambiguity additional corrections of offsets of gyroscopes 1a 1b, which axes are close to the horizontal plane, are applied.

One variant of such correction, which does not use an additional sensor, is shown at FIG. 6. From output signal of one of gyroscopes 1a the value $\omega_{x0}$, stored in the offset memory 13 is subtracted, which gives as a result the corrected signal $\omega'_x$. It is further integrated by an integrator 49 for a period, determined by timer 50. The sign detector 51 produces +1 as output signal when the result from integration is positive or −1 in the case of negative result. The resultant value is multiplied by a certain coefficient in scaling block 52 and at the end of integration period is fed by switch 53 to adder 54, where it is added to the value, stored in offset memory 13. The result of the addition is stored back into offset memory 13. At the end of integration period the timer 50 resets the value of integrator 49. As a result of described actions the stored offset value $\omega_{x0}$ is updated in up or down direction until the number of periods with positive value at integrator output becomes equal to the number of periods with negative value. The same actions are applied for gyroscope 1b.

Another variant of correction of offsets of gyroscopes 1a and 1b, which axes are close to the horizontal plane, using inclinometers, is shown at FIG. 7. From output signal of one of gyroscopes 1a the value $\omega_{x0}$ is subtracted, stored in the offset memory 13, which gives as a result the corrected signal $\omega'_x$. Using coordinate transformation, performed by block 56 the signal is converted in angular velocity, which vector is collinear to the sense axis of inclinometer 2b, which measures the inclination of axis Oy towards the horizontal plane. Further, the converted angular velocity is integrated by integrator 60. The result from integration is compared in subtracting block 61 with the signal from inclinometer 2b. The difference value is multiplied by certain coefficients in scaling blocks 59 and 62. The result from scaling block 59 is used for correction of the result from the coordinate transformation in block 56 by adder 58, while the result from scaling block 62 is subtracted from the value, stored in offset memory 13 by subtracting block 63.

The same procedure is applied to the signal of gyroscope 1b. From its output signal the value $\omega_{y0}$ is subtracted, stored in the offset memory 15, which gives as a result the corrected signal $\omega'_y$. Using coordinate transformation, performed by block 65, the signal is converted in angular velocity, which vector is collinear to the sense axis of inclinometer 2a, which measures the inclination of axis Ox toward horizontal plane. Further, the converted angular velocity is integrated by integrator 57. The result from integration is compared in subtracting block 68 with the signal from inclinometer 2a. The difference value is multiplied by certain coefficients in scaling blocks 67 and 69. The result from scaling block 67 is used for correction of the result from the coordinate transformation in block 65 by adder 66, while the result from scaling block 69 is subtracted from the value, stored in offset memory 15 by subtracting block 70.

The invention claimed is:

1. A system for controlling an antenna that is mounted on a vehicle, the system comprising:
   a motor coupled to adjust an orientation of the antenna with respect to the vehicle;
   angular velocity sensors, which are fixed to the antenna and are configured to generate outputs indicating a measure of a rotation of the antenna about respective axes of a coordinate system that is fixed with respect to the antenna; and
   an antenna control block, which is coupled to receive and process the outputs so as to calculate a correction to be applied to the measure of the rotation, and to cause the motor to change the orientation of the antenna with respect to the vehicle responsively to the measure of the rotation subject to the correction.

2. The system according to claim 1, and comprising an inclination sensor, which is configured to measure an inclination of the antenna, wherein the antenna control block is coupled to calculate the correction responsively to the measured inclination.

3. The system according to claim 2, wherein the angular velocity sensors are configured to sense the rotation of the antenna about respective horizontal axes, and wherein the inclination sensor is configured to measure the inclination of the antenna relative to a vertical axis.

4. The system according to claim 3, wherein the control block is configured to integrate the outputs of the angular velocity sensors in order to calculate respective inclination angles of the angular velocity sensors, and to calculate the correction by comparing the calculated inclination angles to the measured inclination.

5. The system according to claim 1, and comprising an electronic beam control block, which is coupled to adjust a beam direction of the antenna under control of the antenna control block.

6. The system according to claim 5, wherein the antenna control block is configured to drive the motor to scan the antenna mechanically about a first axis while the beam direction is held fixed with respect to a second axis, and to calculate the correction based on respective strengths of a signal received from the antenna in two or more positions of the antenna.

7. The system according to claim 1, wherein the antenna control block is configured to perform a forward coordinate transformation based on the outputs of the angular velocity sensors in order to correct an azimuth and elevation of the antenna, and to perform a reverse coordinate transformation in order to calculate the correction to be applied to the measure of the rotation indicated by the outputs.

8. A method for controlling an antenna that is mounted on a vehicle, the method comprising:
receiving outputs of angular velocity sensors that are fixed to the antenna, the outputs indicating a measure of a rotation of the antenna about respective axes of a coordinate system that is fixed with respect to the antenna;
processing the outputs so as to calculate a correction to be applied to the measure of the rotation; and
driving a motor to change an orientation of the antenna with respect to the vehicle responsively to the measure of the rotation subject to the correction.

9. The method according to claim 8, and comprising measuring an inclination of the antenna using an inclination sensor, wherein processing the outputs comprises calculating the correction responsively to the measured inclination.

10. The method according to claim 9, wherein the angular velocity sensors are configured to sense the rotation of the antenna about respective horizontal axes, and wherein the inclination sensor is configured to measure the inclination of the antenna relative to a vertical axis.

11. The method according to claim 10, wherein calculating the correction comprises integrating the outputs of the angular velocity sensors in order to calculate respective inclination angles of the angular velocity sensors, and comparing the calculated inclination angles to the measured inclination.

12. The method according to claim 8, and comprising electronically adjusting a beam direction of the antenna responsively to the measure of the rotation.

13. The method according to claim 12, wherein driving the motor comprises scanning the antenna mechanically about a first axis while the beam direction is held fixed with respect to a second axis, and wherein processing the outputs comprises calculating the correction based on respective strengths of a signal received from the antenna in two or more positions of the antenna.

14. The method according to claim 8, wherein processing the outputs comprises performing a forward coordinate transformation based on the outputs of the angular velocity sensors in order to correct an azimuth and elevation of the antenna, and performing a reverse coordinate transformation in order to calculate the correction to be applied to the measure of the rotation indicated by the outputs.

* * * * *